United States Patent [19]

Strait

[11] Patent Number: 5,732,607
[45] Date of Patent: Mar. 31, 1998

[54] PORTABLE MACHINE TOOL

[75] Inventor: David S. Strait, Lyle, Wash.

[73] Assignee: Climax Portable Machine Tools, Inc., Newberg, Oreg.

[21] Appl. No.: 440,202

[22] Filed: May 12, 1995

[51] Int. Cl.$^6$ ................................................. B23B 3/26
[52] U.S. Cl. ...................... 82/1.2; 408/75; 408/80; 408/83.5
[58] Field of Search .................. 82/1.2, 1.4; 408/75, 408/79, 80, 83.5, 124

[56] References Cited

U.S. PATENT DOCUMENTS

| | | | |
|---|---|---|---|
| 4,050,836 | 9/1977 | Anders | 408/80 |
| 4,468,158 | 8/1984 | Pearce et al. | 82/1.2 |
| 4,842,452 | 6/1989 | Strait | 408/83.5 |
| 4,856,390 | 8/1989 | Ricci | 82/1.2 |
| 5,429,456 | 7/1995 | Kivech | 408/83.5 |

FOREIGN PATENT DOCUMENTS

| | | | |
|---|---|---|---|
| 17013 | 11/1991 | WIPO | 82/1.2 |

Primary Examiner—Daniel W. Howell
Attorney, Agent, or Firm—Smith-Hill and Bedell

[57] ABSTRACT

A machine tool comprises a chuck mountable in a bore of a workpiece, a drive assembly attached to the chuck, and a tool head releasably attached to the drive assembly. The tool head has a tool head body, and a drive shaft extends through the tool head body and is coupled to an input shaft of the drive body. The input shaft of the drive assembly is connected through a reduction gear and an output shaft to the tool head body for supplying power thereto.

18 Claims, 9 Drawing Sheets

PORTABLE MACHINE TOOL

BACKGROUND OF THE INVENTION

This invention relates to a portable machine tool.

Many industrial plants employ wedge gate valves for controlling flow of fluids through pipes.

As shown in FIG. 1, a wedge gate valve comprises a valve body 2 having two valve port portions 4 that define respective axially aligned valve bores, each of which ends in an annular recess 6. A seat ring 10 is placed in each recess 6 and is welded to the valve body 2 by a seal weld 7. Each seat ring 10 has a sealing face 12 that is inclined to the axis 8. The planes of the two sealing faces converge and intersect at a line that is perpendicular to the fluid flow axis 8. The valve also comprises a wedge-shaped gate 14 having two faces 16 that are parallel to the two sealing faces 12 respectively, and a valve operator 18 for displacing the gate along a path perpendicular to both the fluid flow axis 8 and the line at which the planes of the two sealing faces 12 intersect. The valve operator 18 displaces the gate 14 between a closed position, in which the gate is between the seat rings 10 and its faces 16 are in sealing relationship with the faces 12 respectively, and an open position, shown in FIG. 1, in which the gate is withdrawn from the space between the seat rings and allows free flow of fluid through the valve bores.

From time to time, it may be necessary to replace a seat ring. This may be accomplished by removing the seal weld 7, by which the seat ring is attached to the valve body, surfacing the recess 6, and welding a new seat ring into position. It may also be necessary from time to time to surface a seat ring in order to repair its sealing face. This may be accomplished by depositing weld on the sealing face and then partially removing the weld to provide a new sealing face.

Access to the seat rings of the wedge gate valve is provided through an access passage 20, which receives the gate 12 when the valve is open. Even when the gate has been removed from the access passage, the space for working on the valve seals is cramped, and access to the seal welds is inconvenient, particularly because the small axial spacing between the two seat rings makes it difficult to introduce appropriate tools into the valve bore.

SUMMARY OF THE INVENTION

In accordance with a first aspect of the invention there is provided a machine tool for operating on a workpiece having a surface that defines a cylindrical bore, said machine tool comprising a drive assembly comprising a chuck body that defines a central axis, at least three jaws each having an engagement face and projecting from the chuck body, at least a first jaw and a second jaw having their engagement faces at a radial extent equal to the radius of the bore, and at least a third jaw being radially displaceable relative to the chuck body, and an attachment formation, and a set-up fixture including a centering jaw having an axis and an engagement face, and an attachment formation that is engageable with the attachment formation of the drive assembly for attaching the set-up fixture to the drive assembly in an orientation such that a half-plane that extends through the central axis of the drive assembly and contains the axis of the centering jaw is included in the sector between the half-plane for the first jaw and the half-plane for the second jaw, whereby when the drive assembly and the set-up fixture are installed in the bore with the engagement faces of the first and second jaws and the engagement face of the centering jaw contacting the surface of the bore, the axis of the drive assembly coincides with the axis of the bore.

In accordance with a second aspect of the invention there is provided a machine tool comprising a chuck mountable in a bore of a workpiece, a drive assembly attached to the chuck and including an output member that is adapted to rotate relative to the chuck in a first sense, and a tool head, and wherein the output member of the drive assembly and the tool head are formed with respective portions of a spiral dovetail coupling, whereby the tool head can be mounted to the drive assembly by engaging the spiral dovetail coupling and rotating the tool head relative to the drive assembly in a second sense, opposite said first sense, and the tool head can be de-mounted from the drive assembly by rotating the tool head in said first sense.

In accordance with a third aspect of the invention there is provided a machine tool comprising a chuck that is mountable in a bore of a workpiece, a drive assembly incorporating a gear mechanism having an input and an output, a tool head, a tubular outer drive transmission shaft connecting the output of the gear mechanism to the tool head, and an inner drive transmission shaft that is coaxial with the outer drive transmission shaft for coupling drive to the input of the gear mechanism.

In accordance with a fourth aspect of the invention there is provided a machine tool comprising a chuck that is mountable in a bore of a workpiece, a tool head that is rotatable relative to the chuck and comprises a tool head body and a tool holder mounted in the tool head body and movable relative thereto along a feed axis, a drive shaft in driving engagement with the tool head for driving the tool head to rotate, and a feed shaft in driving engagement with the tool holder for driving the tool holder to move relative to the tool head body along the feed axis, and wherein one of said shafts is tubular and the other shaft extends coaxially within said one shaft.

In accordance with a fifth aspect of the invention there ms provided an epicyclic gear assembly comprising an annular internally toothed gear means surrounding a cylindrical cavity, a bearing means attached to the internally toothed gear means and defining an axis of rotation, a main drive shaft having a journal portion fitted in the bearing means and an eccentric portion defining an eccentric axis that is parallel to but spaced from said axis of rotation, said eccentric portion having a center of gravity that is spaced from said axis of rotation, an externally toothed gear means mounted on the eccentric portion of the main drive shaft for rotation relative to the main drive shaft about said eccentric axis, the externally toothed gear means being in meshing engagement with the internally toothed gear means, and a counterweight attached to the main drive shaft and having a center of gravity that is on the opposite side from said eccentric axis of a plane that extends through said central axis and is perpendicular to the plane that contains said central axis and the center of gravity of said eccentric portion.

In accordance with a sixth aspect of the invention there is provided a machine tool comprising a chuck mountable in a bore of a workpiece, a drive assembly attached to the chuck and including an input member for receiving power, an output member for supplying power, and a reduction gear effective between the input member and the output member, and a tool head that is attachable to the drive assembly, the tool head comprising a tool head body and a drive shaft that extends through the tool head body and is coupled to the input member of the drive assembly, whereby upon rotating the drive shaft, drive is transmitted by way of the input member, the reduction gear, and the output member of the drive assembly to the tool head.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

It will be assumed for the sake of clarity in the following description of the illustrated wedge gate valve seal weld removal machine that the valve body 2 is oriented so that the axis 8 is horizontal and the line at which the planes of the sealing faces 12 intersect is horizontal. In this orientation, installation and use of the wedge gate valve seal weld removal machine is simpler than if the valve body were in a different orientation. However, the machine can also be used with the valve body in a different orientation.

Figure 1:
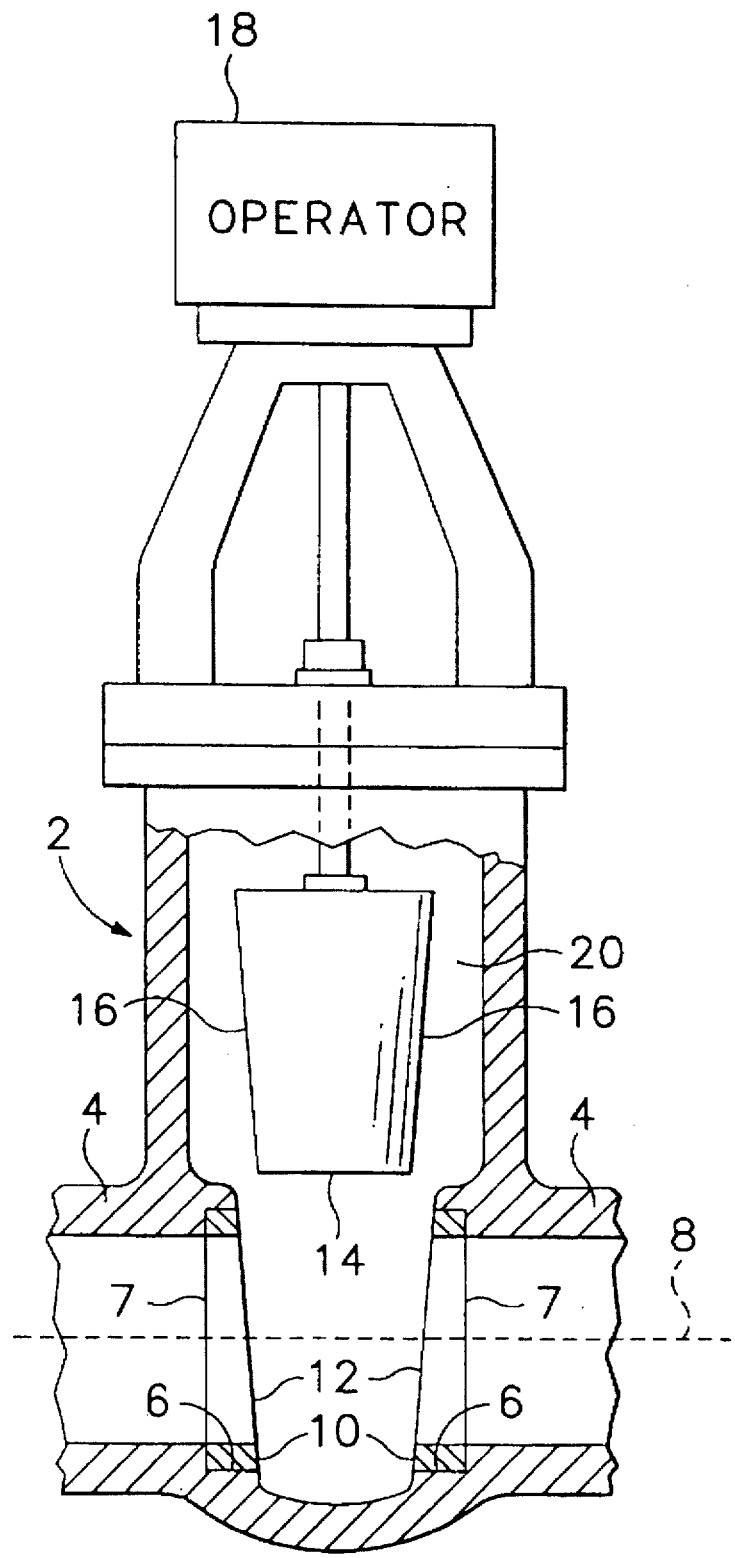
FIG. 1 is a sectional view of a wedge gate valve.
Figure 2:
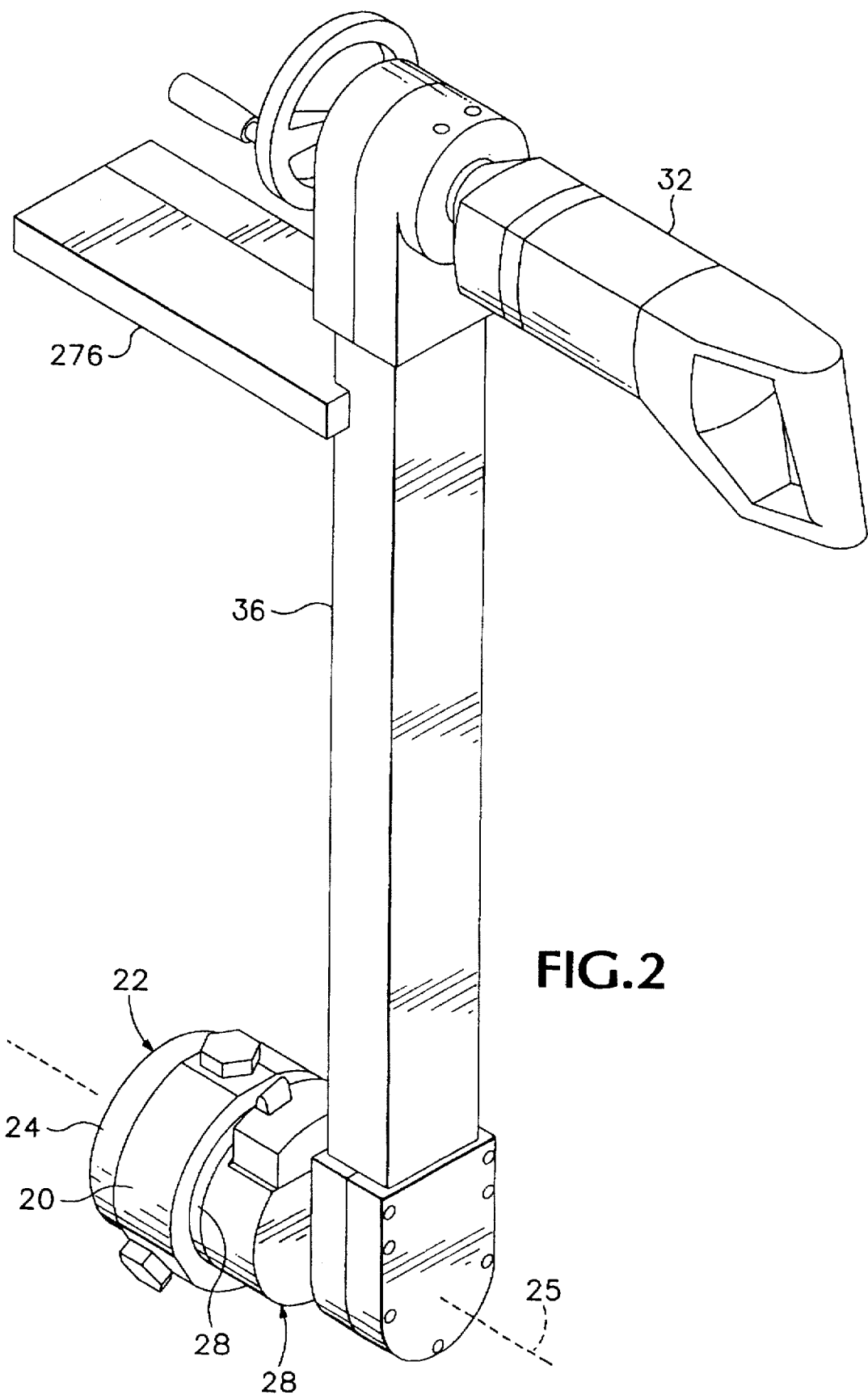
FIG. 2 is a general perspective view of a wedge gate valve seal weld removal machine embodying the present invention, the machine comprising a drive assembly, a tool head assembly, and a power supply assembly, and being used in conjunction with a set-up fixture assembly.

Referring to FIG. 2, the illustrated wedge gate valve seal weld removal machine comprises a drive assembly 22 that includes a chuck 20 for mounting the drive assembly in the valve bore, a drive body 24 that is attached to the chuck and defines a central axis of rotation 25, and a spindle 26 that is journalled in the drive body for rotation about the central axis. A tool head assembly 28 is releasably coupled to the spindle for rotation relative to the drive body 24 and chuck 20 about the axis 25. A power supply assembly comprises a power unit 32 and a power transmission unit 36 for coupling drive from the power unit 32 to the drive assembly 22. These components are used in conjunction with a set-up fixture assembly 40 (FIGS. 3–4) for properly positioning the drive assembly 22 within the valve bore.

Figure 3:
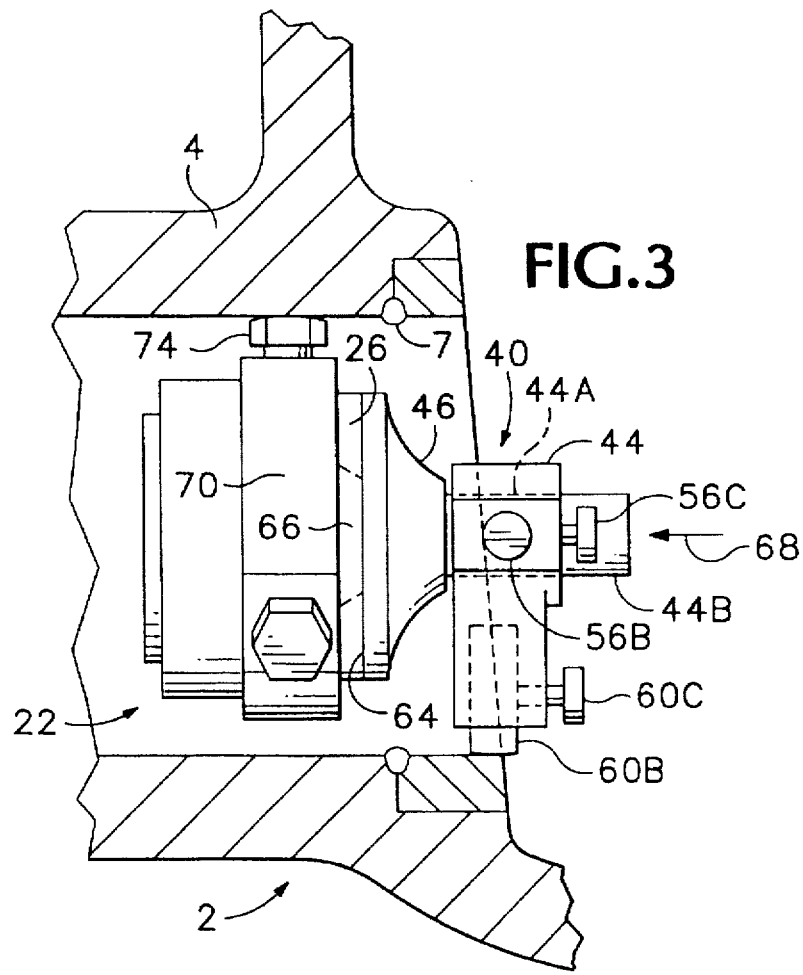
FIG. 3 is a sectional view, partly broken away, showing the drive assembly and the set-up fixture assembly mounted in a valve bore, and illustrates a set-up fixture mount that is part of the set-up fixture assembly.
Figure 4:
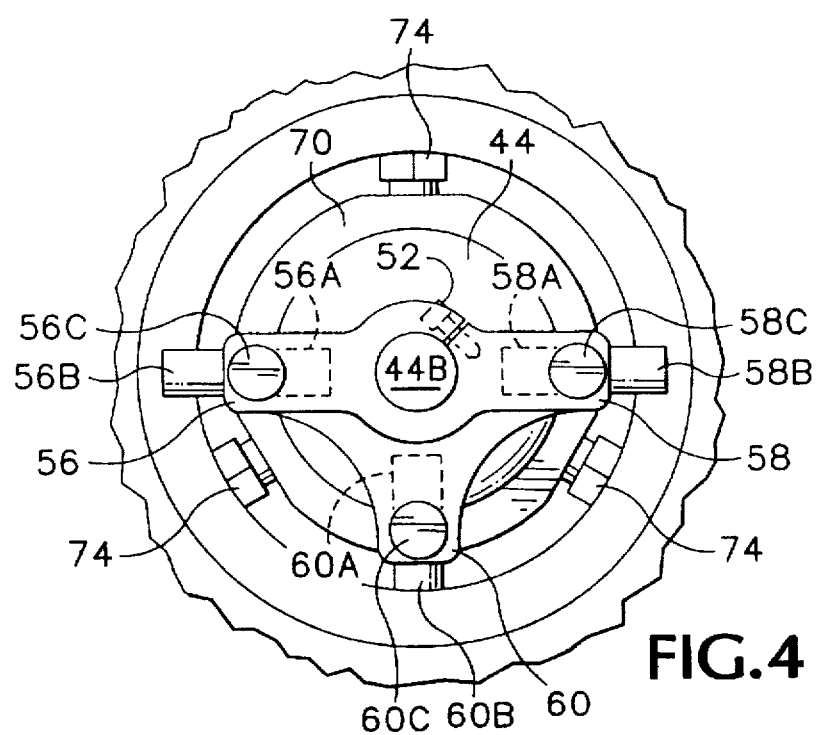
FIG. 4 is a view taken on the line IV—IV of FIG. 3.

Referring to FIGS. 3 and 4, the set-up fixture assembly 40 comprises a set-up fixture body 44 formed with a spindle bore 44A and a spindle 44B that fits in the spindle bore 44A and is attached to a set-up fixture mount 46. The fixture body 44 incorporates a split clamp that is closed about the spindle 44B by tightening screws 52.

Figure 5:
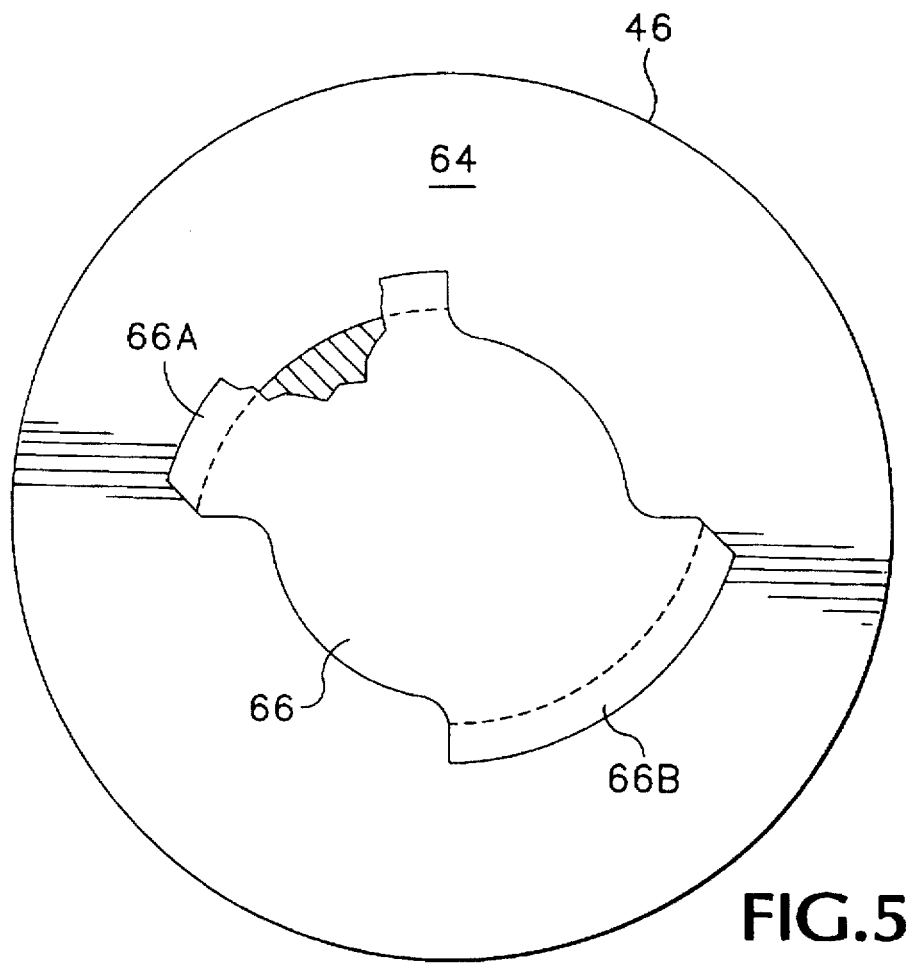
FIG. 5 is an end view of the set-up fixture mount.

The set-up fixture body 44 has three arms 56, 58, and 60, which are formed with bores 56A, 58A, and 60A. The bores 56A and 58A in the arms 56 and 58 are aligned with each other and their common axis intersects the axis of the spindle bore 44A at right angles. The bore 60A in the arm 60 intersects the common axis of the bores 56A and 58A and the axis of the spindle bore 44A at right angles. The central axes of the bores 56A, 58A, 60A define a reference plane of the set-up fixture assembly. A centering jaw 60B is received with a close fit in the bore 60A and depth setting jaws 56B and 58B are received with a close fit in the bores 56A and 58A respectively. Referring also to FIG. 5, the set-up fixture mount 46 has a reference surface 64 that is perpendicular to the axis of the spindle 44B and is provided with a spiral dovetail tenon 66 that tapers in the counter-clockwise direction as seen in the direction of the arrow 68 of FIG. 3 (clockwise as seen in FIG. 5).

Figure 6:
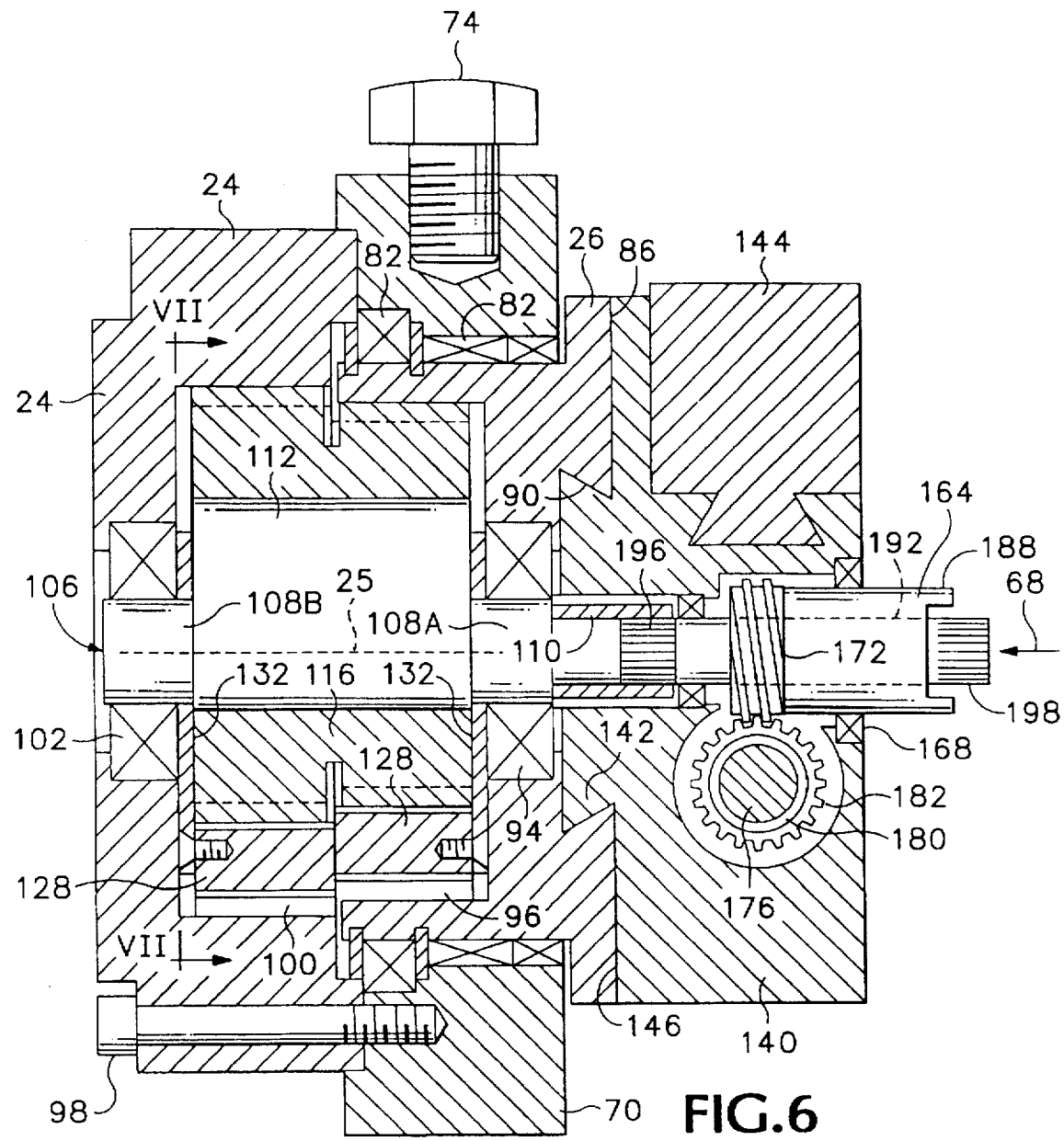
FIG. 6 is a sectional view of the drive assembly and the tool head assembly coupled thereto.

Referring to FIGS. 3, 4, and 6, the chuck 20 comprises an annular chuck body 70 and three screw jaws 74 that extend from the peripheral surface of the chuck body radially with respect to the central axis 25 and are equiangularly spaced about the central axis 25. The spindle 26 is journalled in the annular chuck body 70 by bearings 82 that allow the spindle 26 to rotate relative to the drive body 24 while restraining the spindle against axial movement relative to the chuck body. The spindle 26 has a reference surface 86 that is formed with a spiral dovetail cavity 90 therein, shown also in FIG. 7. The spindle 26 is tubular and a bearing 94 is fitted in the bore of the spindle at the end farther from the drive body. The spindle is formed with an internal spur gear 96 at its end nearer the drive body.

The drive body 24 is attached to the chuck body 70 by screws 98 and supports a bearing 102. The bearings 94 and 102 are coaxial and define the central axis 25. A main drive shaft 106 has two journals 108A, 108B that are fitted in the bearings 94 and 102 respectively. Thus, the main drive shaft 106 is rotatable about the central axis 25. The journal 108A has a stub projecting axially therefrom and carrying a spline coupling 110.

Figure 8:
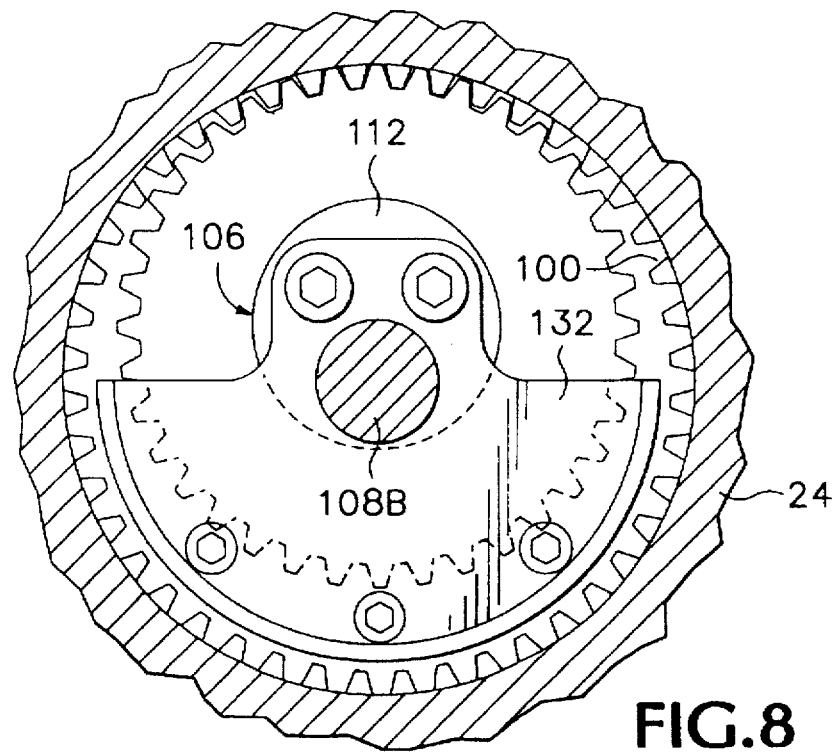
FIG. 8 is a sectional view taken on the line VIII—VIII of FIG. 6.

The drive body 24 incorporates an internal spur gear 100, shown also in FIG. 8. The main drive shaft 106 has an eccentric portion 112 between the journals 108 and on which an annular main drive gear body 116, having two external spur gears 116A, 116B, is mounted for rotation on a needle bearing (not shown). The gears 116A, 116B are in mesh with the gears 96 and 100 respectively. When the main drive shaft 106 rotates in the clockwise direction (seen in the direction of the arrow 68) about the central axis 25, engagement of the gears 100, 116B forces the body 116 to rotate about the eccentric portion 112, and engagement of the gears 96, 116A forces the spindle 26 to rotate in the clockwise direction. The gears 96, 100, 116A, and 116B constitute a compound epicyclic reduction gear which converts high speed, low torque rotation of the main drive shaft 102 to low speed, high torque rotation of the spindle 26.

Counterweights 128 for counterbalancing the eccentric portion 112 are attached to the main drive shaft 106 by counterweight mounting plates 132.

Figure 9:
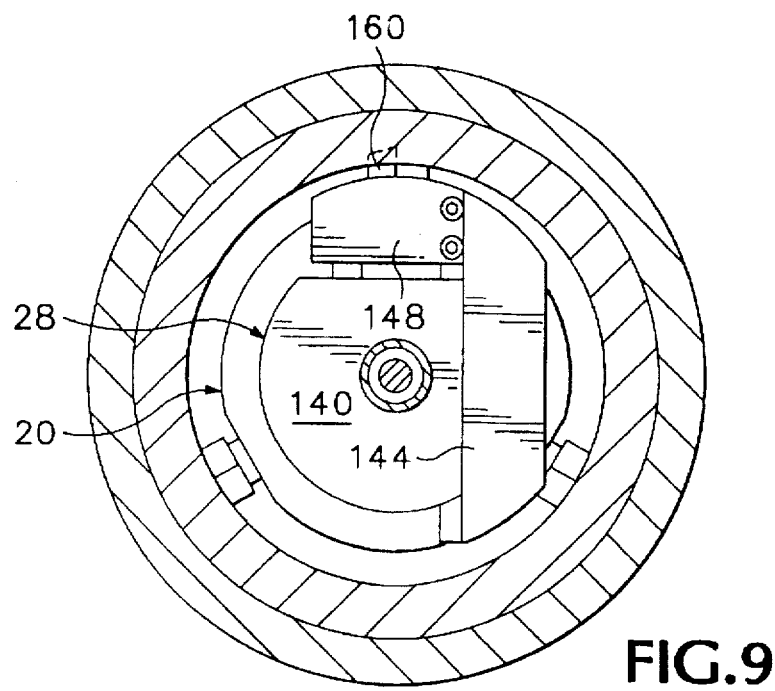
FIG. 9 is an axial sectional view illustrating the tool head assembly and the drive assembly installed in the valve bore.
Figure 10:
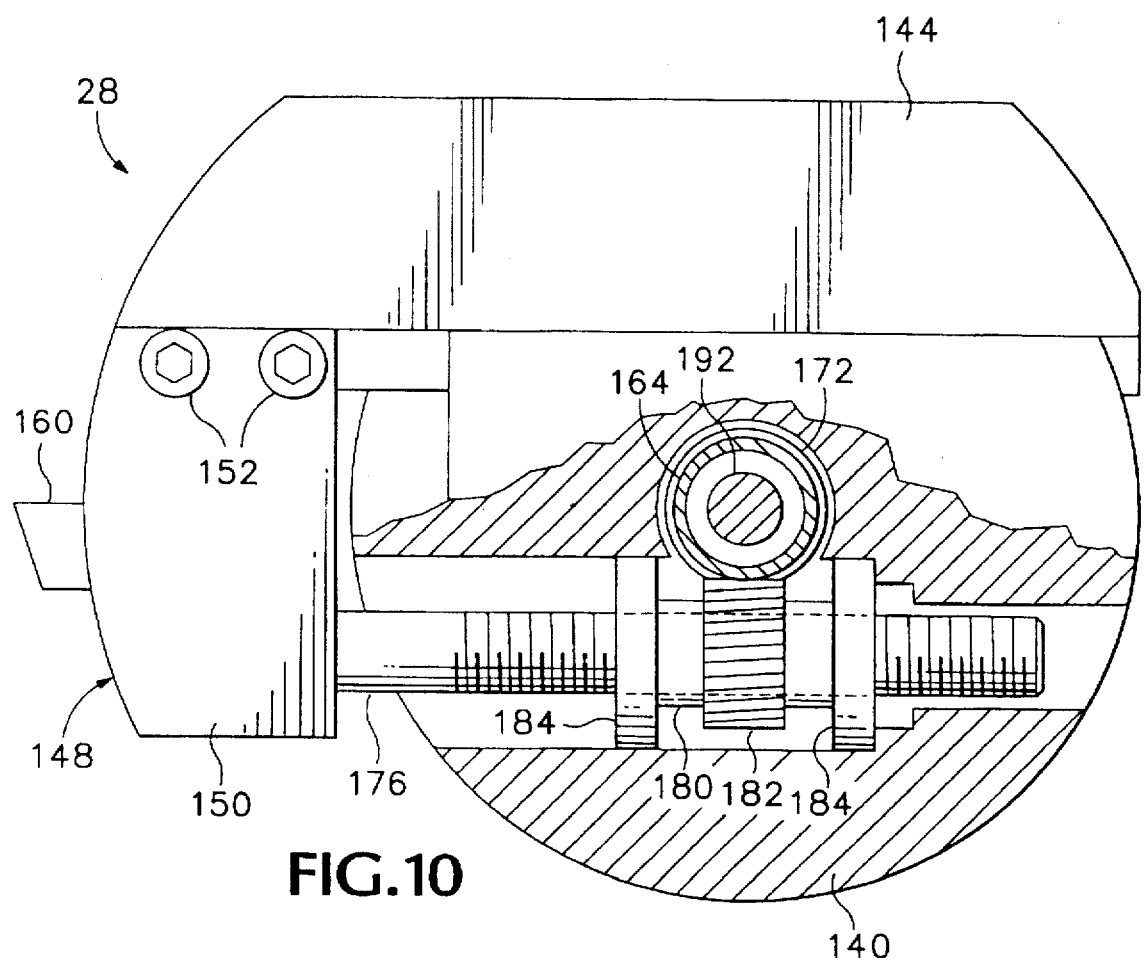
FIG. 10 is an enlarged partial sectional view of the tool head assembly.

Referring to FIGS. 6, 9, and 10, the tool head assembly 28 is generally cylindrical and comprises three main parts, namely a tool head body 140, a tool arm 144, and a tool holder 148. The tool head body 140 has a reference surface 146 (FIG. 6) from which a spiral dovetail tenon 142 similar to that of the set-up fixture mount 62 projects. The tool arm 144 is mounted to the tool head body 140 by means of a linear dovetail tenon that projects from the tool arm and runs in a dovetail groove of the tool head body. The tool holder 148 is used to hold a tool bit 160 and comprises a tool holder base 150 formed with a dovetail groove for receiving the dovetail tenon of the tool arm 144. When the tool holder base has been installed on the tool arm 144, screws 152 are used to secure the tool base against movement relative to the tool arm 144. The tool holder also comprises a tool holder wedge (not shown) which clamps the tool bit 160 in position relative to the tool holder base 150 with the cutting edge of the tool bit 160 at a predetermined axial distance from the reference surface 146 of the tool head body.

A tubular feed shaft 164 is fitted in the tool head body 140 by means of a bearing 168 that allows relative rotation while preventing relative axial movement. The feed shaft is provided with dogs 188 at one end and is provided with an external helical gear 172 at its opposite end. Referring to FIG. 10, a lead screw 176 is held against rotational movement relative to the tool holder 148 and extends from the tool holder 148 into the tool head body 140. The lead screw is in threaded engagement with a lead nut 180 that is disposed in the tool head body 140 and is journalled in bearings 184 that allow the lead nut to rotate but restrain it against axial movement. The external helical gear 172 of the tubular feed shaft 172 is in mesh with a gear 182 that is provided at the exterior of the lead nut 180. Thus, rotation of the feed shaft 164 relative to the tool head body 140 causes the lead nut to rotate, advancing or retracting the tool holder 148 depending on the sense of rotation of the feed shaft.

A drive shaft 192 extends coaxially within the feed shaft 164 and is provided with splines 196, 198 at its two opposite ends. The drive shaft 192 is rotatable relative to the feed shaft 164 but is held against axial movement relative thereto.

Figure 11:
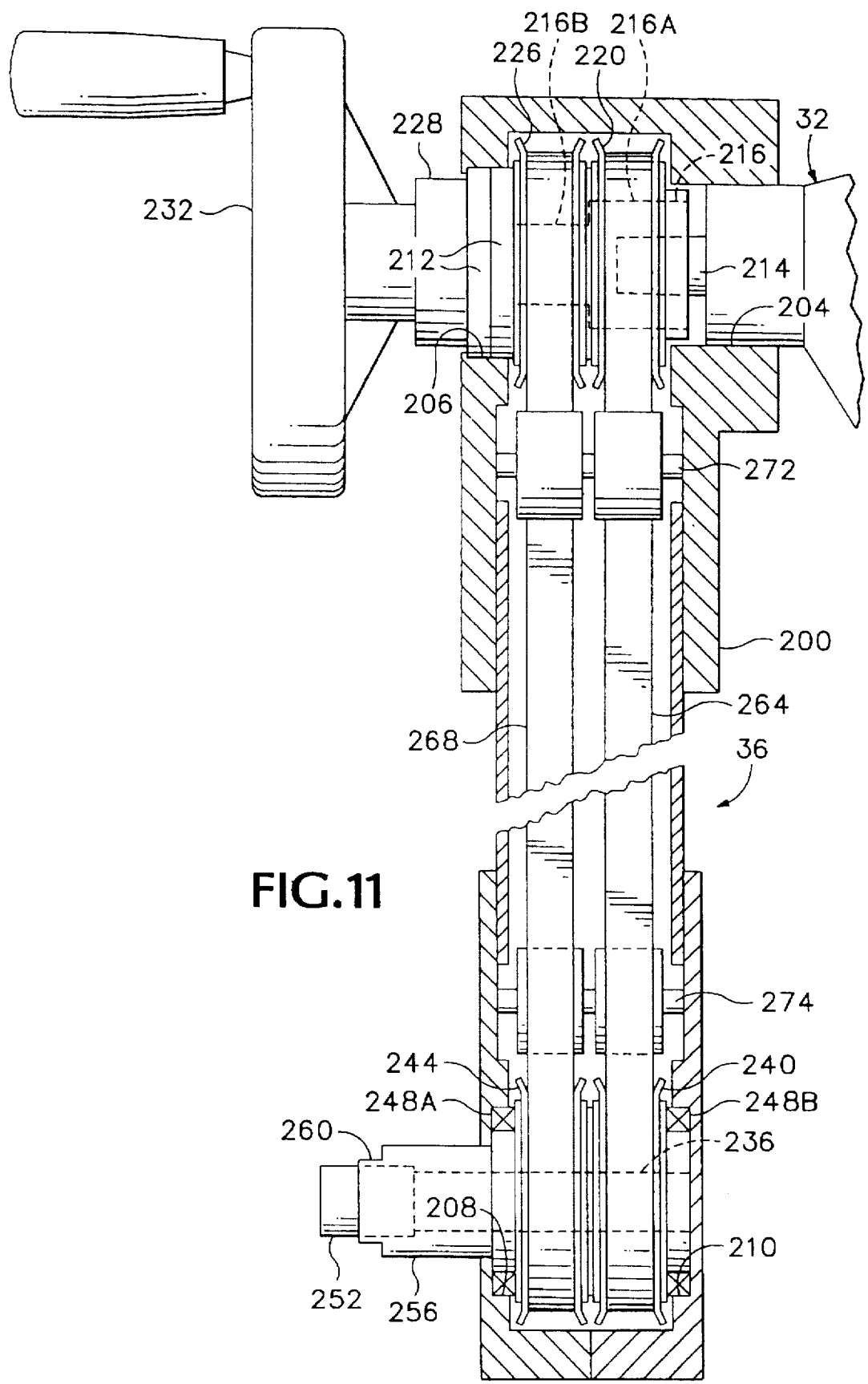
FIG. 11 is a partial sectional view of the drive assembly.

Referring to FIG. 11, the power transmission unit 36 comprises a drive housing 200 having upper and lower ends. At the upper end of the housing, there are two axially aligned bores 204, 206, and at the lower end of the housing there is a single bore 208 axially aligned with a cylindrical recess 210. The common axis of the bore 208 and recess 210 is parallel to the common axis of the bores 204, 206. The power unit 32 includes a housing that includes a cylindrical nose portion that is held in the bore 204 by set screws (not shown). An output drive shaft 214 projects from the drive unit housing into the drive housing 200, and engages an upper drive shaft 216. The upper drive shaft 216 has a segment 216A of greater diameter and a segment 216B of lesser diameter. An upper drive pulley 220 is press fit on the segment 216A of the shaft 216. Art upper feed pulley 224 is mounted on the segment 216B of the shaft 216 by means of a bearing (not shown) that allows the pulley 224 to rotate relative to the drive shaft 216. The pulley 224 is connected through its hub to an upper feed shaft 228, which is in turn connected to a hand wheel 232. The hub of the pulley 224 and the upper feed shaft 228 are journalled in bearings 212 that are held in the bore 206.

At the lower end of the housing 200, bearings 248A and 248B are received in the bore 208 and the recess 210 respectively. A cylindrical hub on a lower drive pulley 240 is journalled in the bearing 248B and a cylindrical hub on a lower feed pulley 244 is journalled in the bearing 248A. A lower tubular feed shaft 256, having dogs 260, is attached to the pulley 244 and projects from the pulley 244 through the bearing 248A. A dowel pin 236 is press fit into the lower drive pulley 240 and is journalled within the tubular feed shaft 256 by needle bearings (not shown). The dowel pin 236 projects from the housing 200 through the bore 208 and carries a splined coupling 252. A drive belt 264 is trained about the pulleys 220 and 240 and a feed belt 268 is trained about the pulleys 224 and 244.

The housing 200 accommodates upper and lower idler bearing shafts 272, 274. Each shaft 272, 274 carries two ball bearings, which are in idling engagement with the drive and feed belts respectively. In this manner, the belts are wrapped approximately 210° about the periphery of each of the pulleys, in order to reduce potential slippage between the pulleys and the belts.

Figure 12:
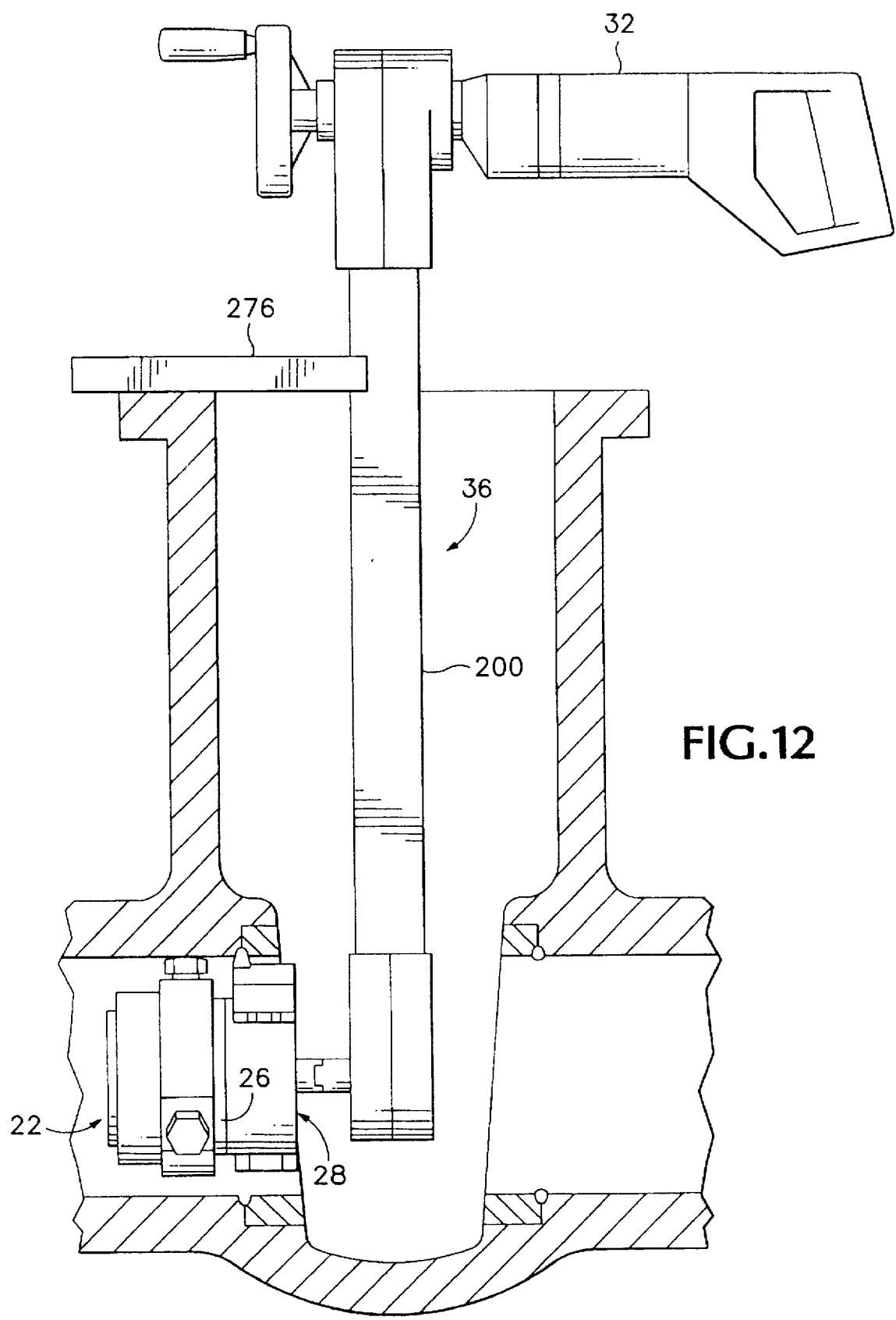
FIG. 12 is a sectional view of the valve body illustrating the wedge gate valve seal weld removal machine installed therein.

Referring to FIGS. 2 and 12, a two-part mounting plate 276 is attached to the housing 200 by gripping the housing between the two parts of the mounting plate. The position of the mounting plate along the housing is adjustable by releasing the housing from the mounting plate and applying the mounting plate to the housing 200 at the desired position.

Figure 7:
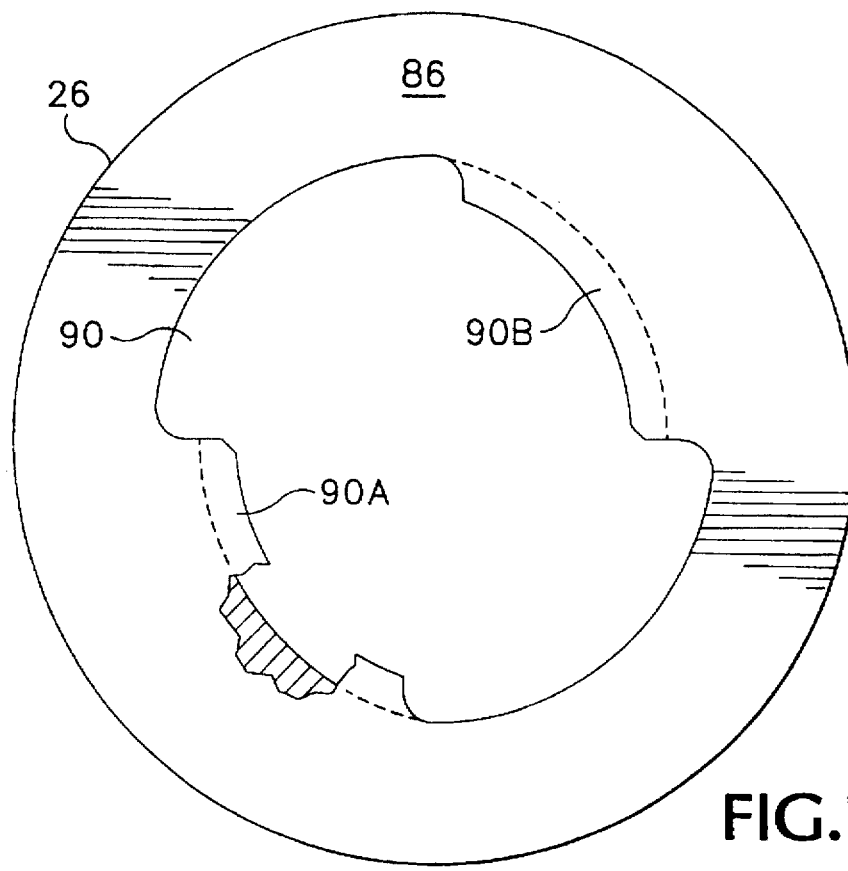
FIG. 7 is an end view of a spindle that is a component of the drive assembly.

Referring to FIGS. 3, 4, 5, and 7, the spiral dovetail tenon 66 of the set-up fixture mount 46 has two angularly spaced, arcuate dovetail segments 66A and 66B, whereas the dovetail cavity 90 of the spindle 26 has two angularly spaced, arcuate overhang segments 90A, 90B separated by recesses. When the set-up fixture mount is applied to the spindle 26, the dovetail segments 66A, 66B of the tenon 66 are inserted in the recesses respectively so that the dovetail tenon 66 of the set-up fixture mount 46 is received in the cavity 90 of the spindle 26. By rotating the set-up fixture mount in the counter-clockwise direction, as seen in FIG. 7, the dovetail segments of the tenon 66 are brought into locking engagement with the overhang segments of the cavity 90 and the set-up fixture mount is securely attached to the spindle 26 with its reference surface in close confronting contact with the reference surface of the spindle 26. By rotating the set-up fixture mount in the clockwise direction after the drive assembly 22 has been locked in position, the dovetail groove is disengaged from the spiral dovetail tenon, and the set-up fixture is thereby released from the spindle 26.

Referring to FIGS. 3 and 4, in order to install the drive assembly 22 in the valve bore, the operator measures the diameter of the valve bore and the depth of the seal weld (the distance of the seal weld from the sealing face of the seat ring in the horizontal plane that contains the axis 8). The operator uses set screws 56C and 58C to lock the depth setting jaws 56B and 58B at positions such that each extends to a distance greater than the radius of the valve bore from the axis of the spindle 44B, and uses a set screw 60C to lock the centering jaw 60B at a position such that the distance between the central axis of the spindle 44B and the engagement face at the outer end of the jaw 60B is equal to the radius of the valve bore. The operator fits the spindle 44B in its bore 44A so that the reference surface of the set-up fixture mount 46 is at a distance from the reference plane of the set-up fixture assembly that depends on the depth of the seal weld, and tightens the clamping screws 52 to hold the spindle 44B in position.

The operator sets two of the jaws 74 of the chuck so that their engagement faces are at the bore radius and sets the third jaw so that its engagement face is at a distance slightly smaller than the bore radius from the central axis 25 of the drive body 24. The set-up fixture mount 46 is applied to the spindle 26 by engagement of the spiral dovetail coupling. The central axis of the set-up fixture spindle 44B then coincides with the central axis 25 of the drive body 24. The drive assembly is placed in the valve bore with the third jaw of the chuck extending vertically upward and the set-up fixture is positioned so that the depth setting jaws 56B, 58B are horizontal and are in contact with the sealing face 12 and the centering jaw 60B extends vertically downward and its outer end rests on the interior of the seat ring 10. The common axis of the set-up fixture spindle 44B and the drive body 24 is then horizontal and coincides with the central axis 8 of the valve bore, and the reference surface of the set-up fixture 62 is at a precisely determined axial position relative to the seal weld 7.

The upper jaw of the chuck 20 is then tightened against the interior of the valve bore, and the set-up assembly can then be detached from the spindle 26, by rotating in the clockwise direction to release the spiral dovetail coupling, and is removed from the valve bore. By virtue of the choice of positioning the set-up fixture mount 46 relative to the set-up fixture body 44, the reference surface 146 of the spindle 26 is at an accurately determined, known distance from the seal weld.

The tool head is then mounted in the valve bore. The splines 196 of the drive shaft 192 are brought into engagement with the coupling 110, and the tool head is rotated in the counter-clockwise direction to engage the spiral dovetail coupling. Engagement of the tool head body 140 with the spindle 26 is accomplished in the same way as engagement of the set-up fixture mount. The dimensions of the tool head are such that the cutting edge of the tool bit is at the axial position of the seal weld 7.

When the tool head has been mounted on the drive body, the power transmission assembly is applied to the tool head. The dogs 260 of the lower feed shaft 256 are brought into engagement with the dogs 188 of the feed shaft 164 and the splined coupling 252 is brought into engagement with the splines 198 of the drive shaft 192. The power transmission assembly is secured to the valve body by means of clamps engaging the mounting plate 276 and a flange portion of the valve body (FIG. 12).

When the power unit 32 is switched on, the upper shaft 216 rotates in the clockwise direction and consequently the drive shaft 192 of the tool head assembly also rotates in the clockwise direction. The splines 196 of the shaft 192 are coupled through the spline coupling 110 to the main drive shaft 106 of the drive body, and the spindle 26 is driven to rotate in the clockwise direction through the reduction gear incorporated in the drive assembly. The tool head assembly 28 rotates with the spindle 26, and rotation of the tool head assembly is coupled through the tool head feed shaft 164, the lower feed shaft 256, the lower feed pulley 244, the feed belt 268, the upper feed pulley 224, and the upper feed shaft 228 to the hand wheel 232. The hand wheel 232 rotates at the same speed and in the same direction as the tool head. If effort is applied to the hand wheel so as to rotate the hand wheel at a greater speed than the tool head assembly, the feed shaft 164 rotates relative to the tool head body 140 in the clockwise direction and the lead nut 180 rotates in the clockwise direction, and consequently the tool holder 148 is urged away from the tool head body 140 along the direction defined by the dovetail guideway between the tool arm 144 and the tool head body 140. Conversely, if effort is applied to the hand wheel to rotate it at a lower speed than the tool head, or to rotate it in the counter-clockwise direction, the tool holder is pulled toward the tool head body.

By having the tool head assembly detachable from the drive assembly, the two assemblies can be installed separately, which is favorable owing to the limited space available in the valve bore and in the passage 20. The compact nature of the compound epicyclic reduction gear allows the drive assembly to be fitted in a bore as small as 200 mm in diameter through a narrow space between sealing surfaces of the valve, yet achieve a high reduction ratio. In the event that a smaller reduction ratio were acceptable, a simple epicyclic reduction gear could be employed instead of the compound gearing.

Figure 13:
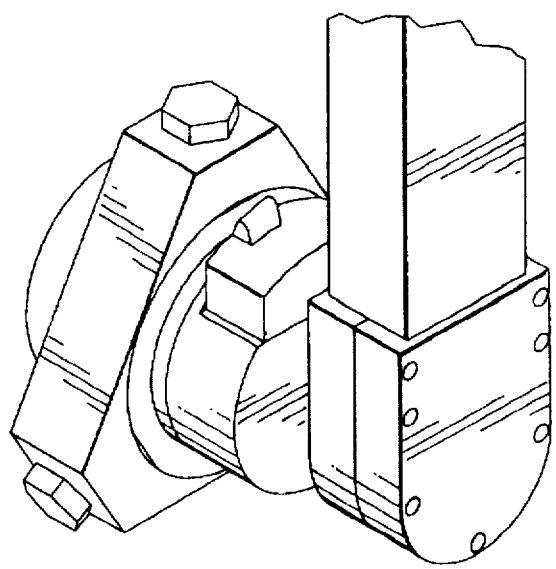
FIG. 13 illustrates a modification of the drive assembly.

It will be appreciated that the invention is not restricted to the particular embodiment that has been described, and that variations may be made therein without departing from the scope of the invention as defined in the appended claims and equivalents thereof. For example, if the chuck body 70 shown in FIG. 4 is too small to fit in the valve bore, the machine may be modified by removing the screw jaws 74 from the chuck body 70 and installing the drive assembly in a chuck extension, as shown in FIG. 13. Moreover, the invention is not restricted to a machine for removing seal welds and may be applied to a machine for repairing the sealing face of the seat ring. In this case, the tool head that is applied to the drive assembly 22 is designed for surfacing the seat ring instead of removing the seal weld. Further, the invention is not restricted to a machine for operating on a wedge gate valve. By suitable design of the jaws of the set-up fixture assembly, the set-up fixture assembly may be designed to fit in the bore of a valve where the sealing face is perpendicular to the axis of the bore.

I claim:

1. A machine tool for operating on a workpiece having a surface that defines a cylindrical bore, said machine tool comprising:
   a drive assembly comprising
      a chuck body that defines a central axis,
      at least three jaws each having an engagement face and projecting from the chuck body, at least a first jaw and a second jaw having their engagement faces at a radial extent equal to the radius of the bore, and at least a third jaw being radially displaceable relative to the chuck body, and
      an attachment formation, and
   a set-up fixture including
      a centering jaw having an axis and an engagement face, and
      an attachment formation that is engageable with the attachment formation of the drive assembly for attaching the set-up fixture to the drive assembly in an orientation such that the first and second jaws extend to opposite respective sides of a first plane, which contains the central axis of the drive assembly and the axis of the centering jaw, and the centering jaw and the first and second jaws extend to the same side of a second plane, which contains the central axis of the drive assembly and is perpendicular to the first plane, whereby when the drive assembly and the set-up fixture are installed in the bore with the engagement faces of the first and second jaws and the engagement face of the centering jaw contacting the surface of the bore, the axis of the drive assembly coincides with the axis of the bore.

2. A machine tool according to claim 1, wherein the jaws of the drive assembly are removable from the chuck body and the drive assembly further comprises a chuck extension for receiving the chuck body and for receiving the jaws removed from the chuck body.

3. A machine tool according to claim 1, further comprising a drive body attached to the chuck body, the drive body having an input drive shaft and an output drive shaft and including gearing for transmitting drive from the input drive shaft to the output drive shaft.

4. A machine tool according to claim 3, wherein the output drive shaft is tubular and the input drive shaft is coaxial with the output drive shaft and extends therethrough.

5. A machine tool according to claim 3, wherein the attachment formation of the drive assembly is formed on the output drive shaft and is one portion of a spiral dovetail coupling, and the attachment formation of the set-up fixture is a complementary portion of the spiral dovetail coupling.

6. A machine tool according to claim 1, wherein the attachment formations of the drive assembly and the set-up fixture are respective portions of a spiral dovetail coupling whereby the set-up fixture can be mounted to the drive assembly by engaging the spiral dovetail coupling and rotating the set-up fixture relative to the drive assembly in a first sense, and can be demounted from the drive assembly by rotating the set-up fixture relative to the drive assembly in a second sense, opposite said first sense.

7. A machine tool according to claim 1, wherein the set-up fixture comprises a fixture body formed with a bore for receiving the centering jaw, and first and second additional bores for receiving mutually coaxial depth setting jaws, whereby when the drive assembly and the set-up fixture are installed in the bore with the depth setting jaws contacting a sealing face that surrounds the bore, the set-up fixture is at an accurately determined axial position relative to the sealing face.

8. A machine tool according to claim 7, wherein the central axes of the centering jaw and the depth setting jaws are coplanar and the set-up fixture body is formed with a fourth bore that is perpendicular to the common plane of the centering jaw and the depth setting jaws, and the set-up fixture further comprises a set-up fixture mount that is formed with the attachment formation of the set-up fixture and includes a spindle portion that is received in the fourth bore of the set-up fixture body, and the set-up fixture includes means for clamping the spindle portion in the fourth bore at a selected axial position, whereby when the drive assembly and the set-up fixture are installed in the bore with the depth setting jaws in contact with the sealing face of the workpiece, the drive assembly is at a predetermined axial position relative to the sealing face.

9. A machine tool comprising:
 a chuck mountable in a bore of a workpiece,
 a drive assembly attached to the chuck and including an output member that is adapted to rotate relative to the chuck in a first sense, and
 a tool head,
and wherein the output member of the drive assembly and the tool head are formed with respective portions of a spiral dovetail coupling, whereby the tool head can be mounted to the drive assembly by engaging the spiral dovetail coupling and rotating the tool head relative to the drive assembly in a second sense, opposite said first sense, and the tool head can be de-mounted from the drive assembly by rotating the tool head in said first sense.

10. A machine tool according to claim 9, further comprising a set-up fixture formed with a portion of a spiral dovetail coupling that matches the portion of the coupling formed on the tool head, whereby the set-up fixture can be mounted to the drive assembly in lieu of the tool head.

11. A machine tool according to claim 9, wherein the drive assembly further includes an input member and a reduction gear effective between the input member and the output member and wherein the tool head comprises a tool head body and a drive shaft that extends through the tool head body and is coupled to the input member of the drive assembly, whereby upon rotating the drive shaft, drive is transmitted by way of the input member, the reduction gear, and the output member of the drive assembly to the tool head.

12. A machine tool comprising a drive assembly incorporating a gear mechanism having an input and an output, a tool head, a tubular outer drive transmission shaft connecting the output of the gear mechanism to the tool head, and an inner drive transmission shaft that is coaxial with the outer drive transmission shaft for coupling drive to the input of the gear mechanism.

13. A machine tool according to claim 12, wherein the tool head comprises a tool holder mounted on the tool head body and movable relative thereto along a feed axis, and a rotatable feed shaft coupled drivingly to the tool holder for effecting movement of the tool holder relative to the tool head body along the feed axis, the rotatable feed shaft being tubular and the inner drive transmission shaft extending within the rotatable feed shaft.

14. A machine tool comprising:
 a chuck that is mountable in a bore of a workpiece,
 a tool head that is rotatable relative to the chuck and comprises a tool head body and a tool holder mounted in the tool head body and movable relative thereto along a feed axis,
 a drive shaft in driving engagement with the tool head for driving the tool head to rotate, and
 a feed shaft in driving engagement with the tool holder for driving the tool holder to move relative to the tool head body along the feed axis,
and wherein one of said shafts is tubular and the other shaft extends coaxially within said one shaft.

15. A machine tool according to claim 14, wherein the feed shaft is tubular and the drive shaft extends coaxially therewithin.

16. A machine tool according to claim 14, further comprising a drive assembly including a gear for transmitting drive from an input of the drive assembly to an output thereof, and a prime mover for supplying power at an output thereof, wherein the tool head is disposed between the drive assembly and the prime mover and the drive shaft couples the output of the prime mover to the input of the drive assembly, and the output of the drive assembly is coupled to the tool head body.

17. A machine tool comprising:
 a chuck mountable in a bore of a workpiece,
 a drive assembly attached to the chuck and including an input member for receiving power, an output member for supplying power, and a reduction gear effective between the input member and the output member, and
 a tool head that is attachable to the drive assembly, the tool head comprising a tool head body and a drive shaft that extends through the tool head body and is coupled to the input member of the drive assembly, whereby upon rotating the drive shaft, drive is transmitted by way of the input member, the reduction gear, and the output member of the drive assembly to the tool head.

18. A machine tool according to claim 12, for machining a workpiece formed with a bore, further comprising a chuck mountable in the bore of the workpiece and wherein the tubular outer drive transmission shaft is journalled in the chuck.

* * * * *